(12) United States Patent
Alexander

(10) Patent No.: US 7,949,979 B1
(45) Date of Patent: May 24, 2011

(54) PREDICTING INDUCED CROSSTALK FOR THE PINS OF A PROGRAMMABLE LOGIC DEVICE

(75) Inventor: Mark A. Alexander, San Francisco, CA (US)

(73) Assignee: XILINX, Inc., San Jose, CA (US)

( * ) Notice: Subject to any disclaimer, the term of this patent is extended or adjusted under 35 U.S.C. 154(b) by 492 days.

(21) Appl. No.: 12/190,729

(22) Filed: Aug. 13, 2008

(51) Int. Cl.
*G06F 17/50* (2006.01)

(52) U.S. Cl. ......... 716/115; 716/106; 716/111; 716/136

(58) Field of Classification Search .................. 716/104, 716/115, 136, 105, 111
See application file for complete search history.

(56) References Cited

U.S. PATENT DOCUMENTS

| | | | |
|---|---|---|---|
| 6,429,715 B1 * | 8/2002 | Bapat et al. .................. | 327/295 |
| 7,013,452 B2 * | 3/2006 | Baras et al. .................. | 333/128 |
| 7,132,847 B1 * | 11/2006 | Wong et al. .................. | 326/29 |
| 7,275,193 B1 * | 9/2007 | Verma ........................ | 714/725 |
| 7,298,229 B1 * | 11/2007 | Ruelke ....................... | 333/116 |
| 2004/0188138 A1 * | 9/2004 | Baras et al. .................. | 174/261 |

* cited by examiner

*Primary Examiner* — Sun J Lin
(74) *Attorney, Agent, or Firm* — LeRoy D. Maunu; Lois D. Cartier

(57) ABSTRACT

Induced crosstalk is predicted for the input/output pins of a programmable logic device. Signal edge rates for the input/output pin are determined from selected interface protocols for the input/output pins. For each pair of the input/output pins, a first coupling coefficient specifies a coupling between the pair of input/output pins within a package for mounting the programmable logic device to a printed circuit board. A depth is input for each via coupled to an input/output pin by the printed circuit board. From the via depths, a second coupling coefficient is determined for each pair of the input/output pins that satisfy a separation criterion. For each of the input/output pins, a predicted value of an induced crosstalk is determined from the first and second coupling coefficients for each pair that includes the input/output pin and another input/output pin, and from the signal edge rate of this other input/output pin.

20 Claims, 4 Drawing Sheets

US 7,949,979 B1

PREDICTING INDUCED CROSSTALK FOR THE PINS OF A PROGRAMMABLE LOGIC DEVICE

FIELD OF THE INVENTION

The present invention generally relates to predicting induced crosstalk, and more particularly to predicting induced crosstalk in a programmable logic device.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs) for interfacing with the pins of the FPGA, configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth. The programmable interconnect connects together the logic implemented in the programmable logic to complete the user design.

During operation of a user design implemented in the PLD, crosstalk noise from signal switching can be coupled between the pins of the PLD. The user design may operate improperly when too much crosstalk noise is coupled to an input/output pin of the PLD.

To ensure that a user design operates properly, accurate prediction of the crosstalk noise may be required. Electromagnetic simulation packages may accurately predict the crosstalk noise. However, these electromagnetic simulation packages are expensive. In addition, executing an electromagnetic simulation and correctly interpreting the results are time-consuming.

The present invention may address one or more of the above issues.

SUMMARY OF THE INVENTION

Various embodiments of the invention provide a method for predicting an induced crosstalk. A selected interface protocol is input for each input/output pin of a programmable logic device. The selected interface protocol for each input/output pin is converted to a corresponding signal edge rate for the input/output pin. For each pair of the input/output pins, a first coupling coefficient is input that specifies a coupling between the pair of input/output pins within a package for mounting the programmable logic device to a printed circuit board. A depth is input for each via coupled to an input/output pin within an outline encompassing the package mounted to the printed circuit board. From the via depths, a second coupling coefficient is determined for each pair of the input/output pins that satisfy a separation criterion. For each of the input/output pins, a predicted value of an induced crosstalk is determined from the first and second coupling coefficients for each pair that includes the input/output pin and another input/output pin, and from the corresponding signal edge rate of this other input/output pin. The predicted value of the induced crosstalk is output for at least one of the input/output pins.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
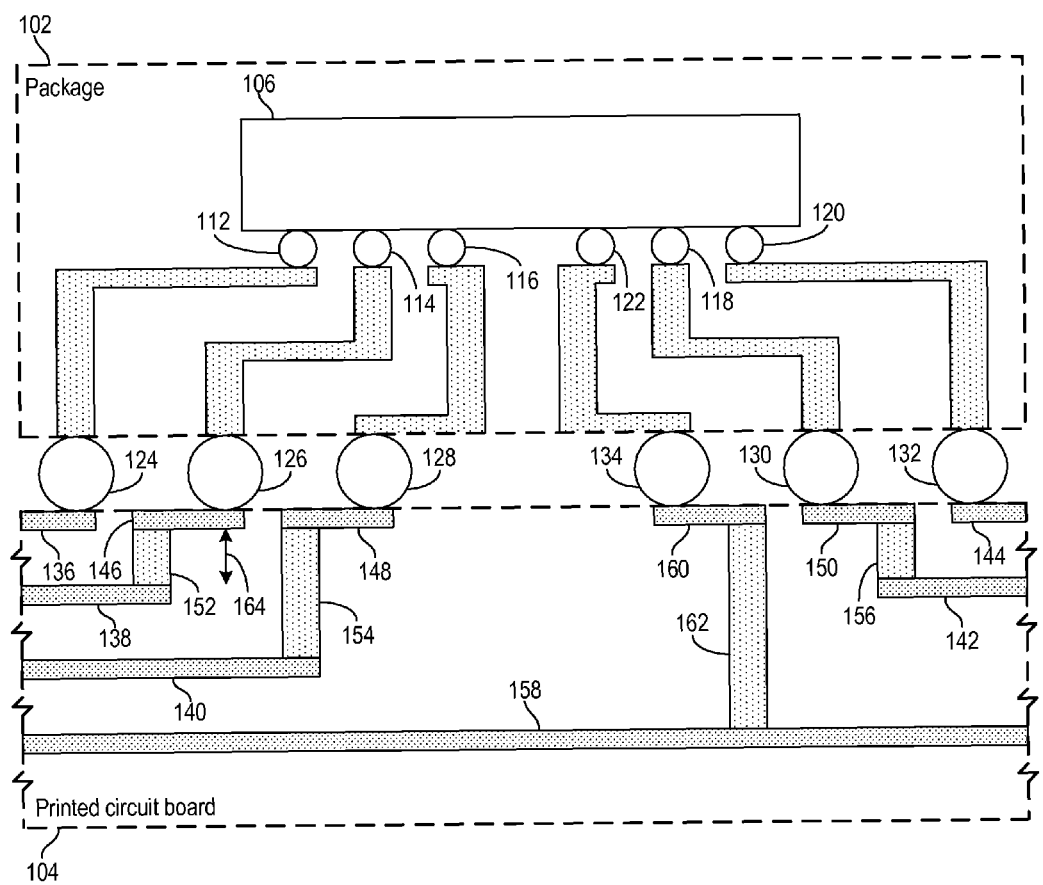
FIG. 1 is a cross-section diagram of a programmable logic device package mounted on a printed circuit board in accordance with various embodiments of the invention.

FIG. 1 is a cross-section diagram of a programmable logic device (PLD) package 102 mounted on a printed circuit board (PCB) 104 in accordance with various embodiments of the invention. The PLD package 102 is one of several types of PLDs produced by a manufacturer of PLDs and the printed circuit board 104 is frequently tailored to the application of the end-user of the PLD. The printed circuit board 104 may extend beyond the limits shown in FIG. 1.

Mounted within the PLD package 102 may be a semiconductor chip 106. The semiconductor chip 106 may include pins 112 through 122. It will be appreciated that PLD chip 106 may include more than five input/output pins and more than one power pin.

The semiconductor chip 106 may be configurable to determine whether each of input/output pins 112 through 120 is an input, an output, or both an input and an output. For example, input/output pins 112 and 118 may be configured as inputs of PLD chip 106, input/output pins 114 and 120 may be configured as outputs, and input/output pin 116 may be configured as both an input and an output. The PLD chip 106 may also be configurable to set a drive strength of the input/output pins that are configured as an output or as both an input and an output. For example, input/output pin 114 may be configured as an output with the drive strength set to a selected capacity for sourcing and sinking current.

For one of input/output pins 112 through 120 that is an "aggressor" pin configured as an output or both an input and an output, the signal swing and/or the drive strength may determine an edge rate of the aggressor pin. The aggressor pin may be inductively or capacitively coupled to another "victim" pin of input/output pins 112 through 120. During the switching of the aggressor pin, switching noise (or "crosstalk") may be coupled from the aggressor pin to the victim pin. The amount of this switching noise on the victim pin may be given by the edge rate of the aggressor pin and the magnitude of the coupling between the aggressor and victim pins.

The switching noise may be an inductively coupled noise voltage given by the current slew rate of the aggressor pin multiplied by the mutual inductance between the aggressor and victim pins. The switching noise may be a capacitively coupled current given by the voltage slew rate of the aggressor pin multiplied by the capacitance between the aggressor and victim pins. The switching noise may include both inductively and capacitively coupled components.

In an example scenario, input/output pin 118 may be a victim pin when configured as an input, and input/output pins 114 and 120 may both be aggressor pins being configured as outputs. The switching of the two aggressor pins 114 and 120 may be controlled by the same clock signal or by synchronously related clock signals. Thus, the aggressor pins 114 and 120 may switch concurrently or simultaneously. Each of the simultaneously switching aggressor pins 114 and 120 may contribute to the induced switching noise on the victim pin 118. In certain situations, the induced switching noise from aggressor pin 114 may tend to cancel the induced switching noise from aggressor pin 120; however, in the worst case the induced switching noise on the victim pin 118 may be the sum of the induced switching noise from aggressor pin 114 and the induced switching noise from aggressor pin 120. Generally, the worst case induced switching noise on the victim pin 118 may be the sum of the induced switching noise from all of the other input/output pins 112, 114, 116, and 120.

The package 102 and the printed circuit board 104 may both contribute to the coupling between each pairing of input/output pins 112 through 120. The total coupling between a pair of the input/output pins 112 through 120 may be a sum of the coupling from package 102 and the coupling from printed circuit board 104.

The manufacturer of package 102 may produce a limited number of types of packages and may have the resources to determine the coupling between each pairing of the input/output pins 112 through 120 from a full three dimensional electromagnetic simulation of the package 102. Thus, the manufacturer of package 102 may accurately determine the coupling between the input/output pins 112 through 120 within package 102.

However, because the printed circuit board 104 may be tailored to the application of the end-user of the PLD and because the manufacturer of package 102 usually would not also manufacture printed circuit board 104, the manufacturer of PLD package 102 generally would not have the information needed to calculate the coupling between two of input/output pins 112 through 120 from printed circuit board 104. Often, the manufacturer of printed circuit board 104 does not have the resources to execute a three dimensional electromagnetic simulation of printed circuit board 104. Thus, the manufacturer the printed circuit board 104 may not have the resources to determine the coupling between two of the input/output pins 112 through 120 from the printed circuit board 104. In various embodiments of the invention, the manufacturer of PLD package 102 may provide a tool for estimating the coupling from printed circuit board 104 between any pairing of the input/output pins 112 through 120.

The package 102 may have multiple layers of interconnect similar to a printed circuit board. Each of the input/output pins 112 through 120 may be connected within package 102 to solder balls 124 through 132, respectively, on the package 102. The power pins, such as power pin 122, may be connected to corresponding solder balls, such as solder ball 134. It will be appreciated that a particular power pin may be interconnected within package 102 with similar power pins and with one or more solder balls on package 102.

The solder balls 124 through 132 for the input/output pins 112 through 120 may connect to traces 136 through 144 of printed circuit board 104. Frequently, solder balls 124 and 132, for example, around the periphery of PLD package 102 are directly connected to respective traces 136 and 144. Solder balls 126, 128, and 130 for input/output pins 114, 116, and 118 within the interior of PLD package 102 may be connected to inner traces 138, 140, and 142 by respective stubs (or "dogbones") 146, 148, and 150 and respective vias 152, 154, and 156. The vias 152, 154, 156, and 162 are usually positioned within an outline on the printed circuit board 104 of the perimeter of package 102 mounted to the printed circuit board 104. For example, the vias 152, 154, 156, and 162 may be positioned in the area of the printed circuit board 104 directly under the package 102.

The solder ball 134 for at least one power pin 122 may be connected to a power plane 158 of printed circuit board 104 by a stub 160 and via 162. The solder balls 124 through 134 may be arranged in a grid with one dimension of the grid shown in FIG. 1. The power solder ball 134 or balls may be arranged in a regular pattern within the grid. For example, every fourth solder ball along a dimension of the grid may be a power solder ball 134 as shown.

The coupling from printed circuit board 104 between, for example, input/output pin 116 as a victim of induced crosstalk from each of the corresponding aggressor pins 112, 114, 118, and 120 may depend upon the distance between the corresponding conductors for these pins within printed circuit board 104. For example, the victim pin 116 may have a significant coupling with aggressor pin 114 in printed circuit board 104 because conductors, including stub 148, via 154, and inner trace 140, for victim pin 116 are nearby the conductors, including stub 146, via 152, and inner trace 138, for aggressor pin 114. However, victim pin 116 may have insignificant coupling with another aggressor pin 120 because the conductors for victim pin 116 are widely separated in printed circuit board 104 from the conductors for aggressor pin 120.

Frequently, coupling between vias 152, 154, and 156 dominates the coupling from printed circuit board 104 between the input/output pins 112, 114, 116, 118, and 120. Various embodiments of the invention predict the coupling between the input/output pins in printed circuit board 104 from the separation between the vias 152, 154, and 156. Certain ones of these embodiments of the invention predict no PCB coupling between a pair of the input/output pins 112, 114, 116, 118 and 120 when the PCB coupling is expected to be insignificant because the corresponding vias are too far apart. Because vias 152, 154, and 156 are usually located close to the corresponding solder balls 126, 128, and 130, no PCB coupling is predicted for a pair of the input/output pins 112, 114, 116, 118, and 120 when the corresponding solder balls 124, 126, 128, 130, and 132 are too widely separated in one embodiment of the invention. For example, coupling between victim pin 116 and aggressor pin 120 may not be calculated because the distance between corresponding solder balls 128 and 132 is greater than three spacing units along one or more grid dimensions as shown.

The coupling from printed circuit board 104 between, for example, input/output pin 118 as a victim of induced crosstalk from aggressor pins 114 and 116 may depend on the depths of the corresponding vias 156, 152, 154. In various embodiments of the invention, the coupling from printed circuit board 104 is calculated from an overlap of the vias. For example, the coupling between input/output pins 114 and 116 may be proportional to an overlap 164 between vias 152 and 154 that equals the lesser of the depths of vias 152 and 154 within printed circuit board 104. For input/output pins 112 and 120 connected to traces 136 and 144 without an intervening via, a default via depth may be assigned to these input/output pins. Thus, the coupling from printed circuit board 104 between pin 118 and pin 120 is the overlap between the depth of via 156 and a default via depth for pin 120, and in one embodiment of the invention this overlap may equal the default via depth.

Any return current paths may influence the coupling between a victim pin 118 and the aggressor pins including pins 114 and 120. For example, the return current path through power pin 122 may reduce the coupling between victim pin 118 and aggressor pin 114 because power pin 122 is positioned in the area between pins 118 and 114. Thus, the coupling between victim pin 118 and the aggressor pin 114 may be less than the coupling between victim pin 118 and aggressor pin 120 because aggressor pin 114 is more distant from victim pin 118 than aggressor pin 120 and because power pin 122 is positioned between victim pin 118 and aggressor pin 114 without being positioned between victim pin 118 and aggressor pin 120.

In one embodiment of the invention, an adjustment factor reduces the calculated coupling from the printed circuit board 104 between a victim pin and an aggressor pin. The calculated coupling may be multiplied by the adjustment factor to account for a regular pattern of power pin 122 or pins on PLD chip 106 or a regular pattern of corresponding solder ball 134 or balls on PLD package 102. The adjustment factor may correspond with the average spacing between a power pin 122 and each input/output pins 112 through 120, or the average spacing between the corresponding solder ball 134 and each corresponding solder ball 124 through 132. Because the three dimensional simulation of the package 102 accounts for the return current paths in package 102, a similar adjustment is not needed for the calculated couplings from package 102.

Figure 2:
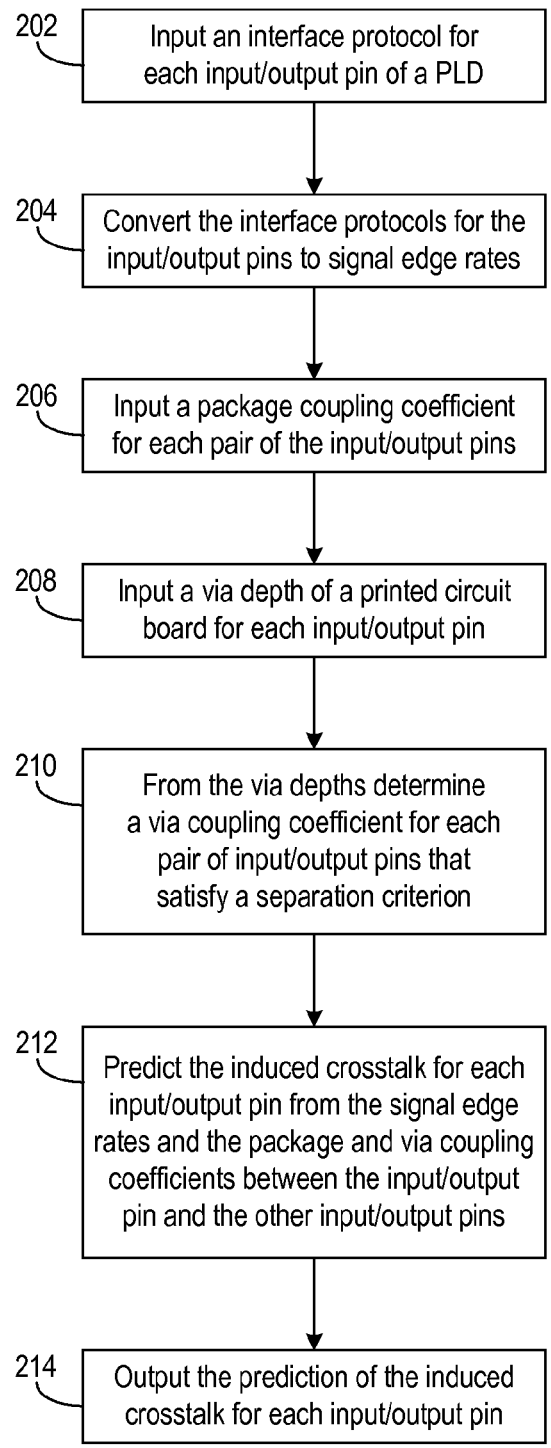
FIG. 2 is a flow diagram of a process for predicting the induced crosstalk for input/output pins of a programmable logic device in accordance with various embodiments of the invention.

FIG. 2 is a flow diagram of a process for predicting the induced crosstalk for input/output pins of a programmable logic device in accordance with various embodiments of the invention. The induced crosstalk may be determined from edge rates for the input/output pins and couplings between pairings of the input/output pins.

At step 202, an interface protocol is input for each input/output pin of a PLD. The interface protocol may select whether each input/output pins is an input, an output, or both an input and an output. The interface protocol may also select a signaling protocol, such as low voltage CMOS or low voltage TTL, having a specified drive strength for the input/output pins. At step 204, the interface protocol for the input/output pins is converted to a signal edge rate. The signal edge rate of an input/output pin may be determined from the signal swing and/or the drive strength of the signaling protocol for the input/output pin. An input/output pin configured as an input may have a default signal edge rate that may be an edge rate of zero.

At step 206, a package coupling coefficient is input for each pair of the input/output pins of the PLD. A three dimensional electromagnetic simulation of the package may provide the package coupling coefficients. The package coupling coefficient may be input for all pairs of the input/output pins. Alternatively, the package coupling coefficient may default to zero for each pair of input/output pins that are insignificantly coupled within the package.

At step 208, a via depth of a printed circuit board is input for each input/output pin of the PLD. A default via depth may be input for each input/output pin that is directly coupled to a surface trace of the printed circuit board without an intervening via.

At step 210, a coupling coefficient of the printed circuit board is calculated from the via depths for each pair of input/output pins that satisfy a separation criterion. The input/output pins may be connected to a grid of solder balls. The input/output pins that satisfy the separation criterion for a particular input/output pin may correspond, for example, to the nearby solder balls within a five by five array of solder balls centered around the solder ball of the particular input/output pin (e.g., up to 24 solder balls). Alternatively, all input/output pins satisfy the distance criterion. A coupling coefficient of the printed circuit board may be calculated for each pair from an overlap of the via depths for the pair of input/output pins. The overlap of the via depths for a pair may be the lesser of the via depths of input/output pins in the pair. The coupling coefficient may depend on the separation between the vias and for a given via separation the coupling coefficient may be proportional to the overlap of the via depths.

At step 212, an induced crosstalk noise is predicted for each input/output pin. The induced crosstalk noise for an input/output pin may be predicted from the edge rates of the input/output pins and the total coupling coefficients between the input/output pin and the other input/output pins. The total coupling coefficient for each pair of input/output pins that satisfy the separation criterion may be a sum of the package and printed circuit board coupling coefficients for the pair of input/output pins. The total coupling coefficient for each pair of input/output pins that do not satisfy the separation criterion may be the package coupling coefficient. The induced crosstalk noise for a victim input/output pin may be predicted as a sum of respective products for the other aggressor input/output pins, and the respective product for each aggressor input/output pin is the product of the edge rate for the aggressor input/output pin and the total coupling coefficient between the victim and aggressor pins. The predicted induced crosstalk noise may be adjusted by a factor accounting for a pattern of the return signal paths through power supply pins of the PLD.

At step 214, the prediction is output of the induced crosstalk noise for the input/output pins. A listing may be output of the input/output pins, if any, that exceed an allowed limit on the induced crosstalk noise.

Figure 3:
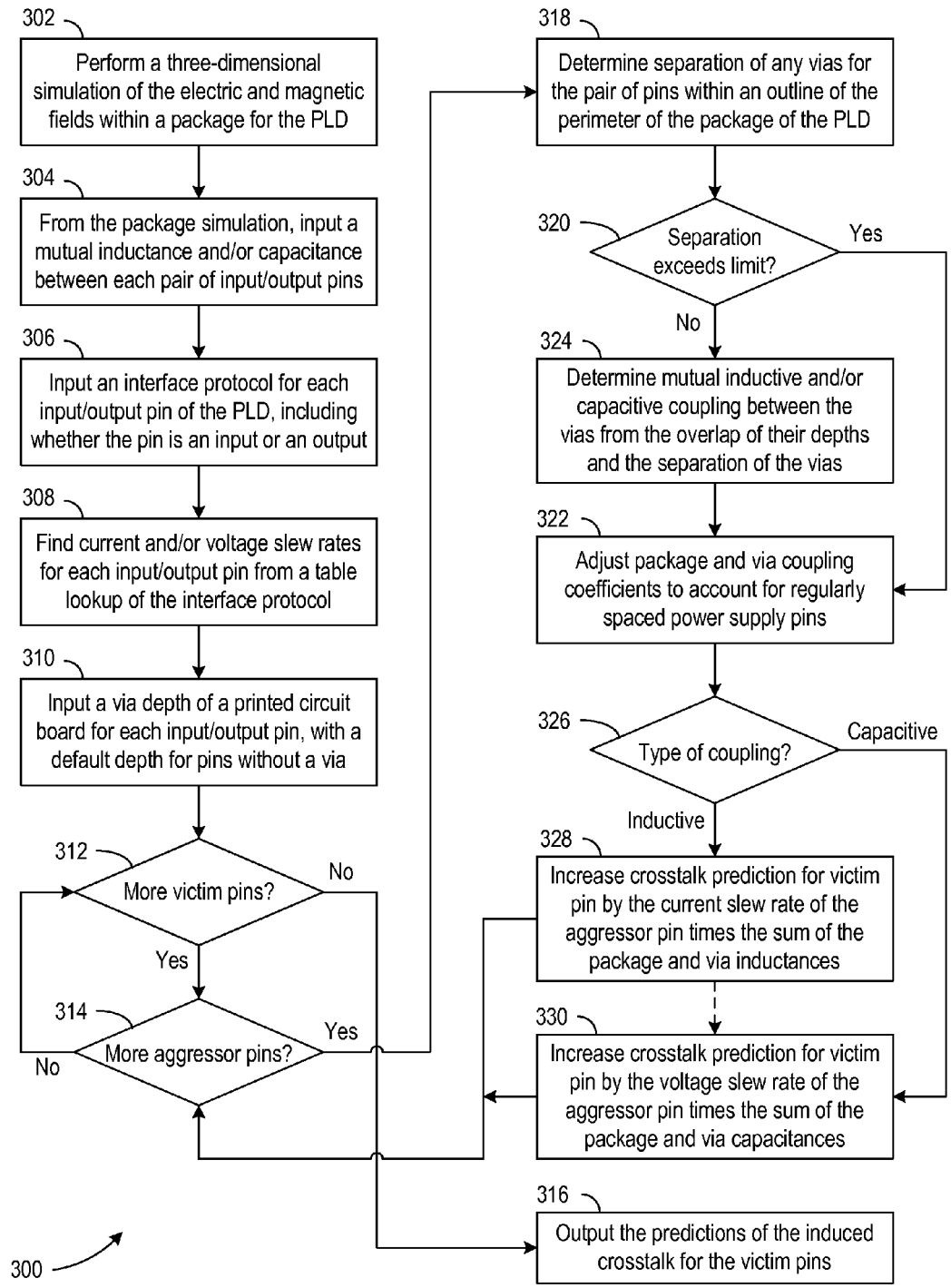
FIG. 3 is a flow diagram of an example process for predicting the induced crosstalk for input/output pins of a programmable logic device in accordance with various embodiments of the invention.

FIG. 3 is a flow diagram of an example process 300 for predicting the induced crosstalk for input/output pins of a programmable logic device in accordance with various embodiments of the invention. If the predicted crosstalk exceeds a noise margin for an input/output pin, the user design and/or the printed circuit board may be modified to reduce the predicted crosstalk for the input/output signals.

At step 302, a three dimensional simulation is performed of the electric and magnetic fields for a package of the PLD. At step 304, the simulation provides a mutual inductance and/or capacitance between pairs of the input/output pins of the PLD. The mutual inductance and/or capacitance may be determined for all pairs of input/output pins of the PLD or for the pairs of input/output pins that satisfy a selection criterion. In one embodiment, the simulation provides scattering parameters of the package for each pair of input/output pins.

At step 306, an interface protocol is input for the input/output pins. The interface protocol for an input/output pin is the signaling protocol, such as low voltage CMOS, and whether the input/output pin is configured as an input, an output, or both. At step 308, current and/or voltage slew rates are determined for each input/output pin using a table lookup for the interface protocol. At step 310, a via depth of a printed circuit board is input for each input/output pin. A default via depth is input for input/output pins without a corresponding via in the printed circuit board.

Decision 312 checks whether all input/output pins of the PLD have been checked as a victim of induced crosstalk noise. If the induced crosstalk noise remains to be calculated for an input/output pin then process 300 proceeds to decision 314 for a current victim pin; otherwise, process 300 proceeds to step 316. Decision 314 checks whether all input/output pins have been checked for inducing crosstalk noise on the current victim pin. If an induced crosstalk noise remains to be calculated between an input/output pin and the current victim pin, then process 300 proceeds to step 318 for a current aggressor pin; otherwise, the calculation is complete for the current victim pin and process 300 returns to decision 312 to check the next victim pin.

At step 318, a separation distance is determined between the victim pin selected at decision 312 and the aggressor pin selected at decision 314. The separation distance may be a distance between any vias for the victim and aggressor pins within an outline of the perimeter of the package of the PLD. Alternatively, the separation distance may be a distance between the pair of the victim and aggressor pins on the package of the PLD. Decision 320 checks whether the separation distance exceeds a limit. If the separation distance between the victim and aggressor pin exceeds a limit, then the PCB coupling between the victim and aggressor pin is predicted to be insignificant and process 300 proceeds to step 322. Otherwise, process 300 proceeds to step 324.

At step 324, the mutual inductive and/or capacitive PCB coupling is calculated between the victim pin and the aggressor pin. The coupling from the printed circuit board is calculated from an overlap of the via depths from step 310 for the victim and aggressor pins. For a given separation between the vias in the printed circuit board, the PCB coupling may be proportional to the overlap of the via depths, and the overlap of the via depths may be the lesser of the via depth for the victim pin and the via depth for the aggressor pin.

At step 322, the couplings from the package and the printed circuit board are adjusted to account for the regularly spaced power supply pins of the PLD. The adjustment may include multiplying the couplings by a factor less than one that reflects an average spacing between each input/output pin of the PLD and the power pins of the PLD.

Decision 326 checks the type of coupling between the victim and aggressor pins. For inductively coupled noise, process 300 proceeds to step 328 and for capacitively coupled noise process 300 proceeds to step 330. In one embodiment, both inductively and capacitively coupled noise are present and calculated, such that process 300 performs both steps 328 and 330.

At step 328, a running total of the induced crosstalk noise is increased by the product of the current slew rate of the aggressor pin and the mutual inductive coupling between the aggressor and victim pins from the package and the printed circuit board. At step 330, a running total of the induced crosstalk noise is increased by the product of the voltage slew rate of the aggressor pin and the capacitive coupling between the aggressor and victim pins from the package and printed circuit board. Process 300 then returns to decision 314 to determine the contribution to the induced crosstalk noise on the victim pin from the next possible aggressor pin.

At step 316, the predicted value of induced crosstalk noise is output for the input/output pins of the PLD. An error message may be output for a predicted value of induced crosstalk noise that exceeds a limit, such as a noise margin of the victim pin. The limit may depend on the interface protocol of the input/output pin. For example, the limit may be a percentage of the signal swing of the interface protocol of the input/output pin.

To correct excessive crosstalk noise, the mapping of signals of a user design to the input/output pins of the PLD may be modified to reduce the induced crosstalk noise on certain input/output pins. For example, a signal mapped to input/output pin with a predicted induced crosstalk noise exceeding an allowed limit may be relocated to another input/output pin.

Figure 4:
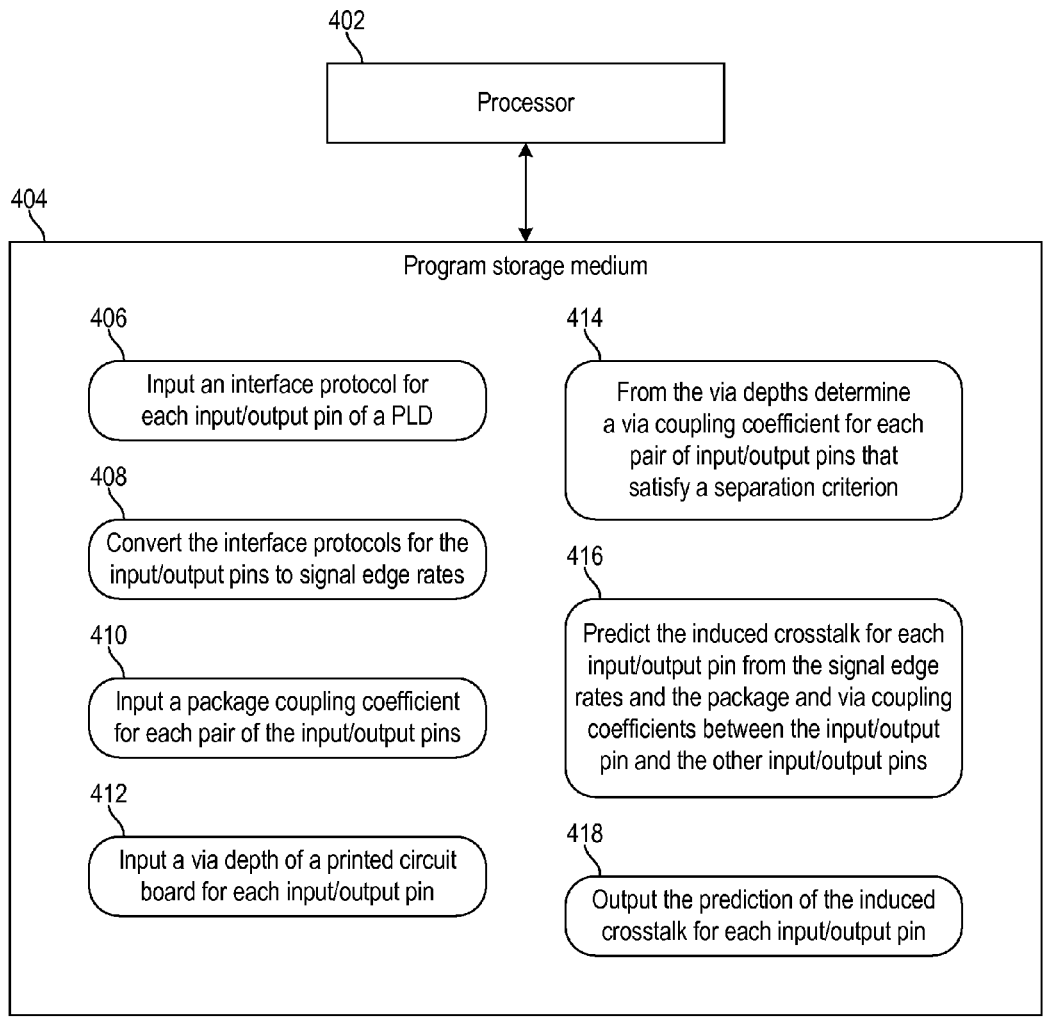
FIG. 4 is a block diagram of a system for predicting induced crosstalk noise for a programmable logic device.

FIG. 4 is a block diagram of a system for predicting induced crosstalk noise for a programmable logic device. A processor 402 may execute instructions read from program storage medium 404.

Execution of the instructions in software module 406 may cause processor 402 to input an interface protocol for each input/output pin of a PLD. Execution of the instructions in software module 408 may cause processor 402 to convert the interface protocols for the input/output pins to a signal edge rate for each input/output pin. Execution of the instructions of software module 410 may cause processor 402 to input a package coupling coefficient for each pair of the input/output pins. Execution of the instructions of software module 412 may cause processor 402 to input a via depth for each input/output pin.

Execution of the instructions in software module 414 may cause processor 402 to determine a coupling coefficient between each pair of input/output pins that satisfy a separation criterion in the printed circuit board. Execution of the instructions in software module 416 may cause processor 402 to predict the induced crosstalk noise for each input/output pin from the signal edge rates of the input/output pins and the coupling coefficients for the package and the printed circuit board.

Execution of the instructions in software module 418 causes processor 402 to output the predicted levels of the induced crosstalk noise for the input/output pins.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

Embodiments of the present invention are applicable to a variety of systems for predicting induced crosstalk. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for predicting an induced crosstalk, comprising:

inputting a selected one of a plurality of interface protocols for each of a plurality of input/output pins of a programmable integrated circuit;
converting the selected interface protocol for each of the input/output pins to a corresponding signal edge rate;
inputting, for each pair of a plurality of pairs of the input/output pins, a first coupling coefficient specifying a coupling between the each pair of input/output pins within a package for mounting the programmable integrated circuit to a printed circuit board;
inputting, for each of the input/output pins that is coupled to a via of the printed circuit board within an outline encompassing the package mounted to the printed circuit board, a depth of the via;
determining from the depths a second coupling coefficient for each pair of the input/output pins that satisfy a separation criterion;
determining a predicted value of an induced crosstalk for each of the input/output pins from the first coupling coefficient and the second coupling coefficient for each pair that includes the each input/output pin and another input/output pin, and from the corresponding signal edge rate of the another input/output pin; and
outputting the predicted value of the induced crosstalk for at least one of the input/output pins;
wherein the method is executed by one or more processors.

2. The processor-implemented method of claim 1, wherein the determining a predicted value of an induced crosstalk for each of the input/output pins includes determining the predicted value of the induced crosstalk for the input/output pin that is a victim of the induced crosstalk from another one of the input/output pins that is an aggressor of the induced crosstalk.

3. The processor-implemented method of claim 1, wherein the corresponding signal edge rate for each input/output pin is a current slew rate, and the first coupling coefficient and the second coupling coefficient are each a mutual inductance between the pair of input/output pins for the coupling coefficient.

4. The processor-implemented method of claim 3, wherein the predicted value of the induced crosstalk for each input/output pin is a predicted value of a total induced voltage for the input/output pin from a simultaneous switching of another one of the input/output pins.

5. The processor-implemented method of claim 1, wherein the corresponding signal edge rate for each input/output pin is a voltage slew rate, and the first coupling coefficient and the second coupling coefficient are each a coupling capacitance between the pair of input/output pins for the coupling coefficient.

6. The processor-implemented method of claim 1, wherein the first coupling coefficient is a scattering parameter matrix of the pair of input/output pins for the first coupling coefficient.

7. The processor-implemented method of claim 1, wherein the inputting a selected one of a plurality of interface protocols for each of a plurality of input/output pins includes selecting the input/output pin to be one of an input pin and an output pin.

8. The processor-implemented method of claim 1, wherein the converting the selected interface protocol for each of the input/output pins to a corresponding signal edge rate includes performing a table lookup of the corresponding signal edge rate for the selected interface protocol of the each input/output pin.

9. The processor-implemented method of claim 1, wherein the converting the selected interface protocol for each of the input/output pins to a corresponding signal edge rate includes performing a table lookup of a voltage slew rate for the selected interface protocol of the each input/output pin, and converting the voltage slew rate for the input/output pin driving a characteristic impedance into a current slew rate that is the corresponding signal edge rate for the input/output pin.

10. The processor-implemented method of claim 1, the inputting a first coupling coefficient for each pair of input/output pins includes determining the first coupling coefficient for each pair of input/output pins from a three-dimensional simulation of electric and magnetic fields within the package for mounting the programmable integrated circuit to the printed circuit board.

11. The processor-implemented method of claim 1, wherein the inputting a depth of a via for each input/output pin includes inputting the depth of the via at the each input/output pin for coupling the input/output pin to an inner trace of the printed circuit board.

12. The processor-implemented method of claim 1, further comprising selecting a default depth for each of the input/output pins that is not coupled to a via of the printed circuit board within the outline corresponding to a perimeter of the package.

13. The processor-implemented method of claim 1, wherein the determining from the depths a second coupling coefficient for each pair of the input/output pins that satisfy a separation criterion includes determining the second coupling coefficient for the pair of input/output pins from an overlap of the depths of vias for the pair of input/output pins and a distance in the printed circuit board between the vias for the pair of input/output pins.

14. The processor-implemented method of claim 13, wherein each pair of the input/output pins satisfies the separation criterion in response to the distance for the pair of input/output pins being less than a limit.

15. The processor-implemented method of claim 1, wherein each pair of the input/output pins satisfies the separation criterion in response to a distance between the pair of input/output pins on the package being less than a limit.

16. The processor-implemented method of claim 1, wherein the determining a predicted value of an induced crosstalk for each of the input/output pins includes determining the predicted value of the induced crosstalk as a sum of a product for each pair that includes the each input/output pin and the another input/output pin satisfying the separation criterion, with the product being a product of the signal edge rate of the another input/output pin and a sum of the first coupling coefficient and the second coupling coefficient for the each input/output pin and the another input/output pin.

17. The processor-implemented method of claim 1, wherein the determining a predicted value of an induced crosstalk for each of the input/output pins includes adjusting the predicted value for an equal spacing pattern of the input/output pins and a plurality of power supply pins on the package of the programmable integrated circuit.

18. An article of manufacture, comprising:
a non-transitory processor-readable program storage medium configured with processor-executable instructions that, when executed by one or more processors, cause the processors to predict an induced crosstalk, by performing steps including,
inputting a selected one of a plurality of interface protocols for each of a plurality of input/output pins of a programmable integrated circuit;
converting the selected interface protocol for each of the input/output pins to a corresponding signal edge rate;

inputting, for each pair of a plurality of pairs of the input/output pins, a first coupling coefficient specifying a coupling between the each pair of input/output pins within a package for mounting the programmable integrated circuit to a printed circuit board;

inputting, for each of the input/output pins that is coupled to a via of the printed circuit board within an outline encompassing the package mounted to the printed circuit board, a depth of the via;

determining from the depths a second coupling coefficient for each pair of the input/output pins that satisfy a separation criterion;

determining a predicted value of an induced crosstalk for each of the input/output pins from the first coupling coefficient and the second coupling coefficient for each pair that includes the each input/output pin and another input/output pin, and from the corresponding signal edge rate of the another input/output pin; and outputting the predicted value of the induced crosstalk for at least one of the input/output pins.

19. The article of manufacture of claim 18, wherein the corresponding signal edge rate for each of the input/output pins is a current slew rate, the first coupling coefficient and the second coupling coefficient are each a mutual inductance between the pair of input/output pins for the coupling coefficient, and the predicted value of the induced crosstalk for each input/output pin is a predicted value of a total induced voltage for the each input/output pin from a simultaneous switching of the another input/output pin.

20. A system for predicting an induced crosstalk, comprising:

means for inputting a selected one of a plurality of interface protocols for each of a plurality of input/output pins of a programmable integrated circuit;

means for converting the selected interface protocol for each of the input/output pins to a corresponding signal edge rate;

means for inputting, for each pair of a plurality of pairs of the input/output pins, a first coupling coefficient specifying a coupling between the each pair of input/output pins within a package for mounting the programmable integrated circuit to a printed circuit board;

means for inputting, for each of the input/output pins that is coupled to a via of the printed circuit board within an outline encompassing the package mounted to the printed circuit board, a depth of the via;

means for determining from the depths a second coupling coefficient for each pair of the input/output pins that satisfy a separation criterion;

means for determining a predicted value of an induced crosstalk for each of the input/output pins from the first coupling coefficient and the second coupling coefficient for each pair that includes the each input/output pin and another input/output pin, and from the corresponding signal edge rate of the another input/output pin; and means for outputting the predicted value of the induced crosstalk for at least one of the input/output pins.

\* \* \* \* \*